(12) United States Patent
Bashuk

(10) Patent No.: US 7,367,467 B2
(45) Date of Patent: May 6, 2008

(54) ADJUSTABLE STORAGE TRAY

(76) Inventor: Gerald D. Bashuk, 4689 Covington Hwy., Decatur, GA (US) 30035

( * ) Notice: Subject to any disclaimer, the term of this patent is extended or adjusted under 35 U.S.C. 154(b) by 284 days.

(21) Appl. No.: 10/655,170

(22) Filed: Sep. 4, 2003

(65) Prior Publication Data
US 2005/0051561 A1  Mar. 10, 2005

(51) Int. Cl.
*B60R 9/00* (2006.01)
*B65D 6/38* (2006.01)
*B65D 6/24* (2006.01)
*B65D 6/04* (2006.01)

(52) U.S. Cl. .................. 220/4.03; 220/4.21; 220/8; 220/608; 220/669; 206/518; 224/404; 224/500

(58) Field of Classification Search ............ 220/8, 220/4.21, DIG. 25, 4.03, 23.4, 608, 669; 206/514, 518; 224/404, 405, 279, 500, 498, 224/320
See application file for complete search history.

(56) References Cited

U.S. PATENT DOCUMENTS

| | | | | |
|---|---|---|---|---|
| 1,861,283 A | | 5/1932 | Nelson | |
| 2,627,801 A | * | 2/1953 | Danziger | 249/157 |
| 3,134,499 A | * | 5/1964 | Johnson | 220/8 |
| 3,887,102 A | * | 6/1975 | Earley | 220/8 |
| 4,288,011 A | | 9/1981 | Grossman | |
| 4,478,337 A | * | 10/1984 | Flum | 211/59.2 |
| 4,593,816 A | * | 6/1986 | Langenbeck | 206/425 |
| 4,749,097 A | * | 6/1988 | Rosman | 220/4.21 |
| 4,770,330 A | | 9/1988 | Bonstead et al. | |
| 4,909,406 A | * | 3/1990 | Wu | 220/8 |
| 5,094,375 A | | 3/1992 | Wright | |
| 5,139,186 A | * | 8/1992 | Loew et al. | 224/42.39 |
| 5,620,125 A | | 4/1997 | Duncan et al. | |
| 5,899,544 A | | 5/1999 | James et al. | |
| 5,988,722 A | | 11/1999 | Parri | |
| 6,007,129 A | | 12/1999 | Kearney, Jr. | |
| 6,634,691 B2 | * | 10/2003 | Henderson | 296/37.6 |
| 6,691,884 B1 | * | 2/2004 | Dwyer | 220/4.03 |
| 7,014,058 B2 | * | 3/2006 | Gledhill | 220/8 |
| 2002/0011489 A1 | * | 1/2002 | Csiszar | 220/4.03 |

* cited by examiner

*Primary Examiner*—Anthony D. Stashick
*Assistant Examiner*—Niki M. Eloshway
(74) *Attorney, Agent, or Firm*—Goldman IP Law; Joel S. Goldman

(57) ABSTRACT

An adjustable storage tray includes an inside tray and an outside tray. Each tray has a plurality longitudinally spaced transverse rib wherein protrusions associated with the ribs of the inside tray are shaped to fit within indentation associated with the ribs of the outside tray.

4 Claims, 4 Drawing Sheets

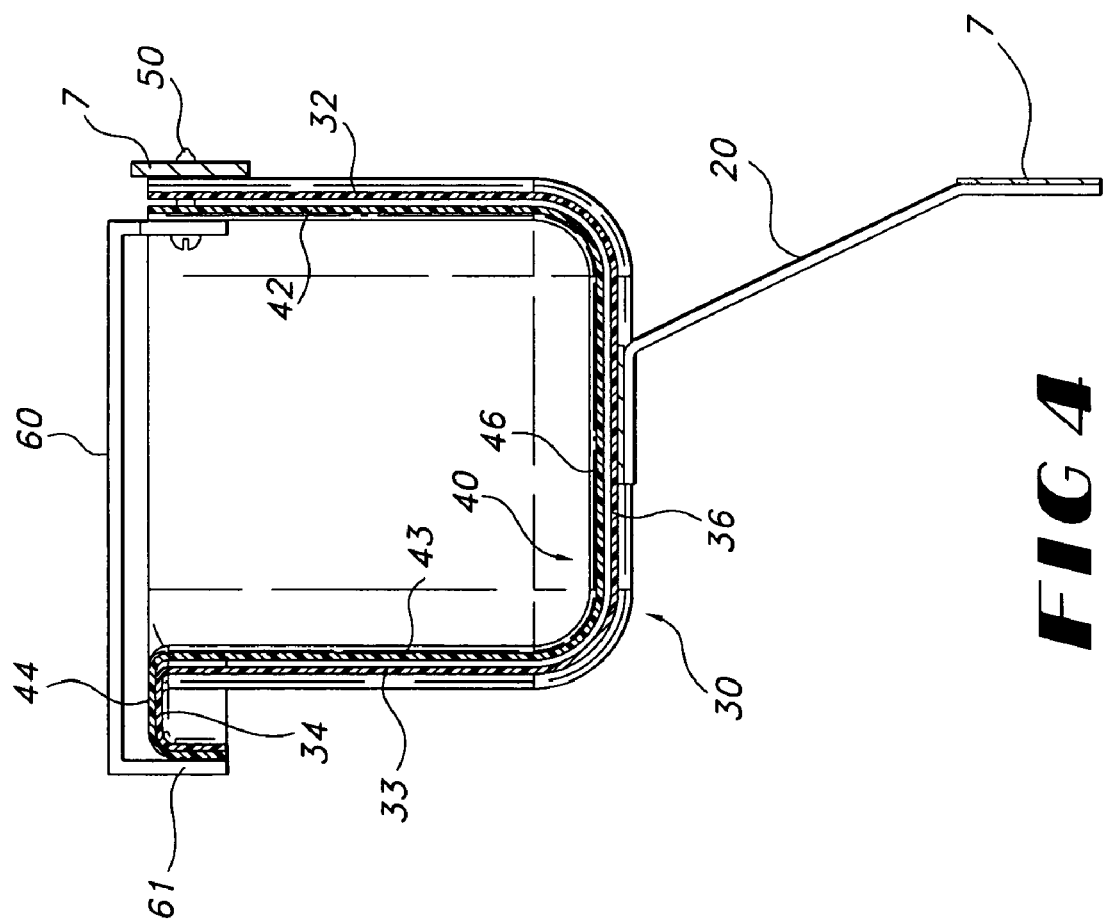

ADJUSTABLE STORAGE TRAY

FIELD OF THE INVENTION

This invention relates to the field of storage systems and in particular to adjustable size storage systems for use in pick-up trucks or the like.

BACKGROUND

There has been a long felt need for a storage system for pick-up trucks which is capable of organizing tools and small items such as nuts and bolts, electrical fixtures and the like. Pick-up trucks typically have a flat bed which provides no built-in means for organizing such items. This need to store and organize small items is particularly acute in pick-up trucks which have roof units installed over their beds. Typically, such roof units have hinged access doors positioned above the tailgate of the truck and/or above one or both of the side walls adjoining the bed of the truck. Such roof units restrict access both to the bed of the truck and, in particular, to the portion of the bed of the truck directly behind the cab making it particularly difficult to reach small items inside the truck.

For example, storage containers directly behind the cab of the truck such as that described illustrated in U.S. Pat. No. 4,288,011 are particularly inaccessible in trucks equipped with a roof unit over their beds. Because of this absence of storage space for small objects, these objects oftentimes become scattered over the bed of the truck and become even more inaccessible to an individual trying to reach them through the side openings in the roof unit. There exists a need, therefore, for a storage unit which is accessible through openings in the size of a roof unit of a pick-up truck. This unit should be sturdy and easy to assemble and should provide compartments for various small items. Preferably, the unit should also not interfere with or restrict access to the bed of the truck nor should it constrict the usable space available on the bed of the truck.

BRIEF DESCRIPTION OF THE DRAWINGS

Further advantages of the invention will become apparent by reference to the detailed description of preferred embodiments when considered in conjunction with the following drawings in which like reference numerals denote like elements throughout the several views and wherein:

FIG. 4 is a cross-sectional view of one embodiment of the storage assembly.

DESCRIPTION OF DISCLOSED EMBODIMENTS

Figure 1:
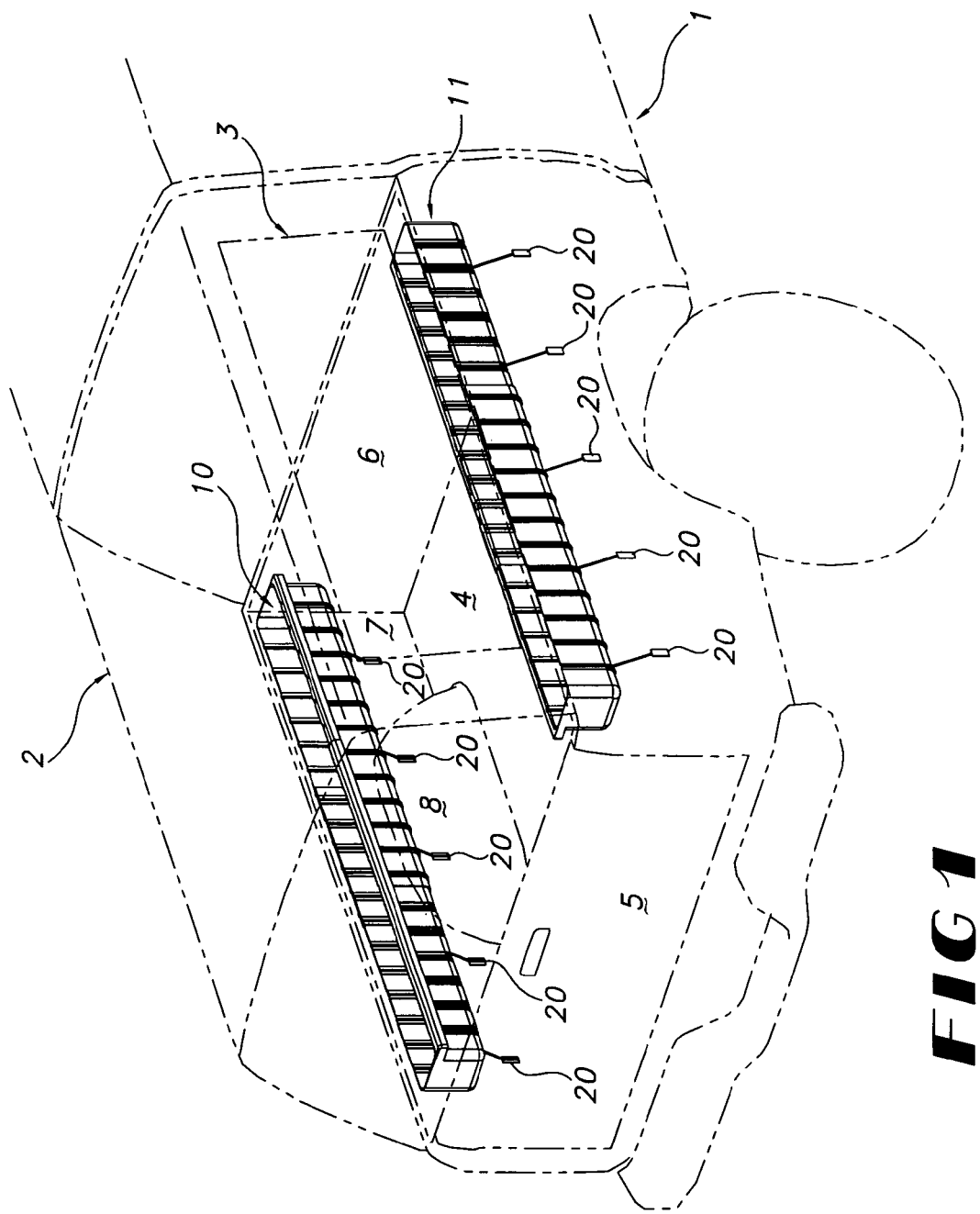
FIG. 1 is a perspective view of a pick-up truck with a roof unit having adjustable storage trays of the present invention installed therein.

Referring now to the drawings, there is depicted in FIG. 1, in broken lines, a pick-up truck 1 having installed thereon a roof unit 2 which has side access openings 3. A bed 4 of the truck is bounded by a tailgate 5, a front wall 6, side walls 7, and wheel wells 8. Installed in the truck 1 are adjustable trays 10 of the present invention. As will be described in greater detail below, these storage trays may be affixed to the side walls 7 of the pick-up truck by screws, bolts or similar fasteners and may be further supported by one or more brackets 10, affixed to the storage tray 10 and to the side walls 7 of the truck.

Figure 2:
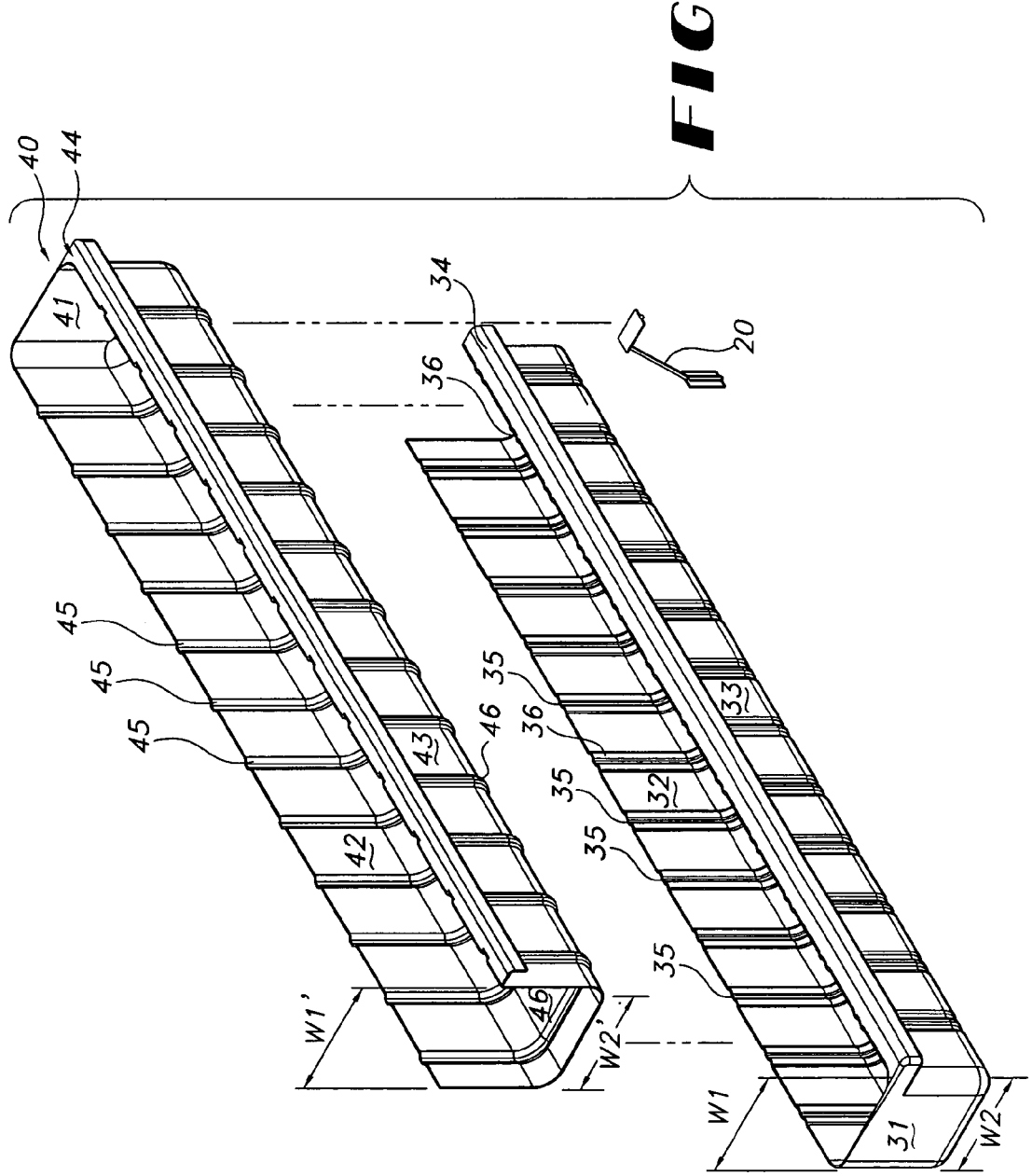
FIG. 2 is an exploded view of the components of a adjustable storage tray of the present invention.

Referring to FIG. 2, the component parts of a tray assembly 10 are depicted. As illustrated, the storage tray 10 is positioned to be installed on the left side wall of the pick-up truck. It will be appreciated, however, that the same components can be used to assemble a storage tray 10 for installation on the right side wall 7 of the pick-up trucks.

The storage tray assembly 10 is comprised of an inner tray unit 40 and an outer tray unit 30. Each of the tray units 30 and 40 may be molded stamped of a light but sturdy material such high density polyethylene (HDPE).

The outer tray unit 30 has an end wall 31, an outer wall 32, an inside wall 33 and a bottom portion 36. The outer wall 32 is adapted to rest against and be fastened to a side wall 7 of the pick-up truck. A flange 34 is formed at the top of the inside wall 33 which gives additional strength to the unit and also prevents sharp edges from being exposed. The outside tray unit 30 is formed with a plurality of shaped ribs 35 which are shaped as protrusions on the outside of the tray unit 30 and as indentations on the inner surfaces of the tray unit 30.

The inner tray unit 40 is similarly formed with an end wall 41, an outside wall 42, an inside wall 43 ending in a flange 44, and a bottom portion 46. The inner tray unit 40 has ribs 45 which are similarly formed and shaped to the ribs 35 of the outer tray unit 3. The respective protrusions and indentions are adaptable to fit within each other. Thus, when the inner tray unit 40 and the outer tray unit are assembled with each other (see FIG. 3), the protrusions of the ribs 46 of the inner tray rest within the indentation portions of the ribs 36 of the outer tray.

The portions of each of the trays opposite their respective end walls 41 and 31 are open as shown. Preferably, the width dimension W, of the outer tray is slightly greater (by approximately one-quarter of an inch or less) than the width dimension W, of the inner portion. Similarly, the width of the bottom portion 36 of the outer tray 30 is greater by about one-quarter of an inch than is the width of the bottom portion 46 of the inner tray 40. This allows the inner tray 40 to fit easily within the outer tray 30 both for assembly within the truck and for shipping. The ribs 35 and 45 in each of the respective 30 and 40 are similarly distanced from each other longitudinally. In a preferred embodiment, the ribs are spaced approximately four inches (4") apart. This allows the inner tray 40 to be assembled with the outer tray 30 to form an adjustable tray 10 the length of which is adjustable in four inch (4") increments. It will be appreciated that alternative arrangements of the distance between ribs 35 and 45 can be used in order to achieve finer or coarser degrees of adjustability for the storage tray 10. For example, one or both of the trays 30 or 40 may have closer spacing of the respective ribs 35 or 45 (e.g., two inches (2")) in order to achieve a finer degree of adjustability of the storage tray 10.

Figure 3:
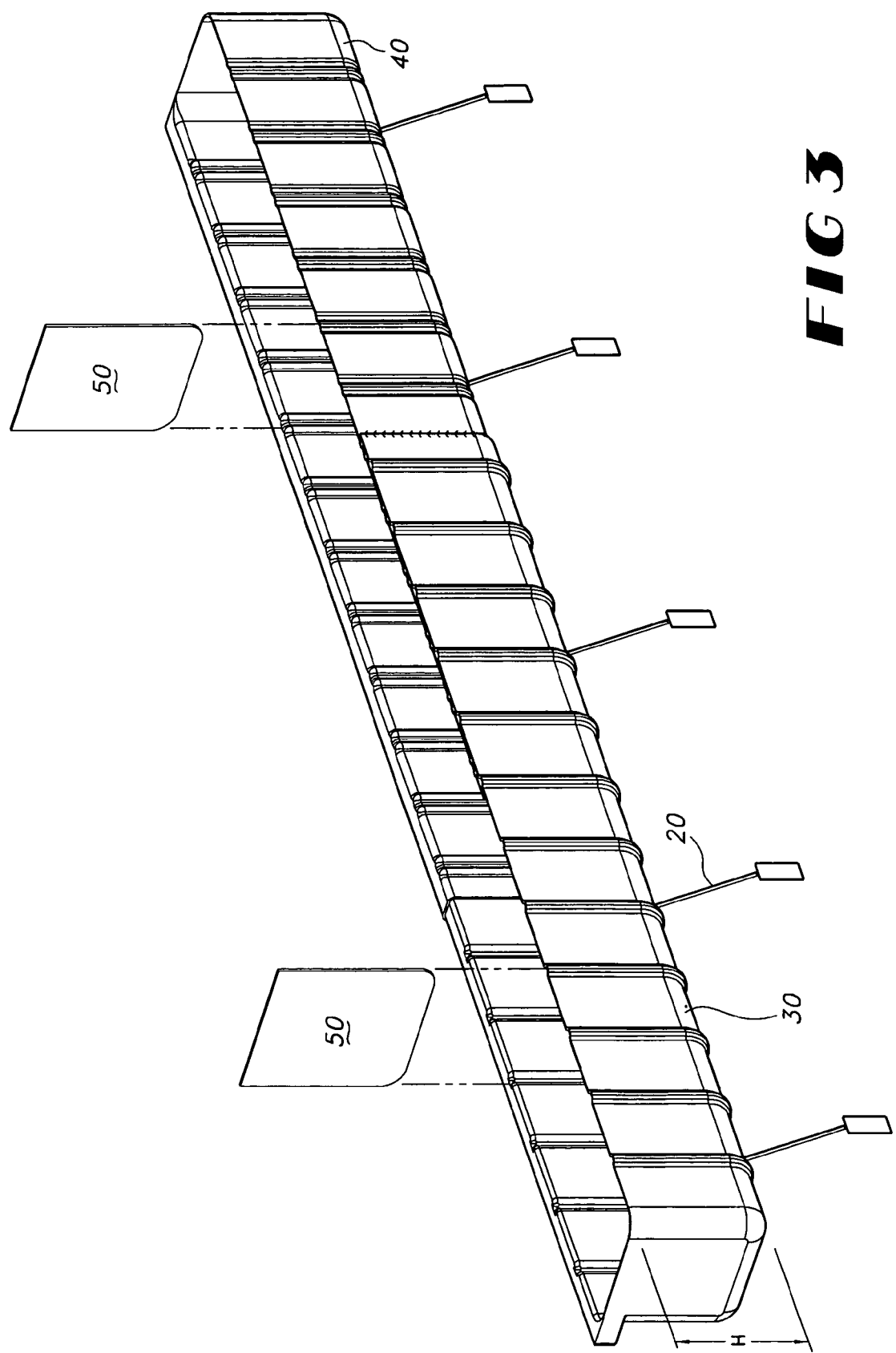
FIG. 3 is a perspective view of an adjustable storage tray assembly.

FIG. 3 shows an inner tray 40 nested within an outer tray 30 to assemble the storage tray 10. It will be noted that the combination of ribs and protrusions prevent sliding motion between one tray and another so that the unit can be assembled to occupy the entire length of the bed of the truck. The height H of the assembly is preferably one which will allow the storage tray 10 to be assembled against the side wall 7 of the pick-up truck without interfering with the wheel well 20 of the pick-up truck (see FIG. 1).

When assembled, a plurality of biscuits or partitions 50 may be inserted into the groves 35 of 45 of the respective outer trays to provide additional compartments within the storage assembly. Such partitioning helps prevent longitudinal movement of small objects in the tray when the truck is in motion and also provides individual compartments for different types of objects.

Referring to FIG. 4 there is shown a cross-sectional view of the storage tray assembly 10 illustrating a manner in which it may be attached to the side walls 7 of the pick-up truck. The inside tray 40 is nested within the outside tray 30 and fastened to the outside wall of the pick-up truck 7 by a fastener 50 which may be a screw, rivet or bolt of the like. The fastening may also be done by means of a suitable adhesive. Additional support is provided by a bracket 20 which is fastened to the side wall 7 and also fastened to the floor 36 of the outside tray by suitable fastening means. Optionally, an additional bracket 60 may be provided which is fastened to the side wall 7 of the truck and has a lip 61 which engages the flange portion 44 of the outside unit thereby preventing bending of the inside walls 33 and 43 of the inside and outside tray units respectively when heavy loads are carried within the storage unit.

While specific embodiments of the invention have been described with particularly above, it will be appreciated that the invention is adaptable to many other configurations known to those skilled in the art.

What is claimed is:

1. For use in a pickup truck having a truck bed and two truck bed sidewalls, and adjustable storage tray comprising: a first tray unit and a second tray unit each of said tray units including:
   a.) an elongated bottom portion,
   b.) an inside wall and an outside wall , each said wall extending upward from opposing longitudinal edges of said bottom portion,
   c.) a single end wall extending upwardly from one end of said bottom portion connecting said sidewalls, the other end of said bottom portion having no end wall extending therefrom,
   d.) a plurality of longitudinally spaced ribs formed transversely across selected portions of the bottom portion of each said tray unit and the respective adjoining portions of the inside wall and the outside wall of each tray unit, each said rib forming a shaped inner indentation in inner surfaces of the bottom portion, the inside wall and the outside wall and complementary shaped protrusions on outside surfaces of the bottom portion the inside wall and the outside wall,
   e.) said first tray unit fits congruently and adjustably within said second tray unit with selected protrusions of said first tray interlocking with selected indentations of said second tray whereby said storage tray is adjustable only in fixed increments determined by the respective longitudinal separation between adjacent ribs of the first tray and the second tray.

2. The storage tray of claim 1 further comprising:
   a.) a plurality of means for attaching the inside wall of said storage tray to a sidewall of said pickup truck.

3. The storage tray of claim 1 wherein each said tray unit further includes, a longitudinal flange formed at a top edge of its outside wall.

4. The storage tray of claim 1 further comprising at least one biscuit shaped partition to slide within the indentations of the tray units for forming compartments in said storage tray separated by said at least one biscuit shaped partition.

* * * * *